Feb. 20, 1945.　　　W. A. BRECHT　　　2,370,002
LOCOMOTIVE GEAR DRIVES
Filed May 28, 1943
Fig.1.
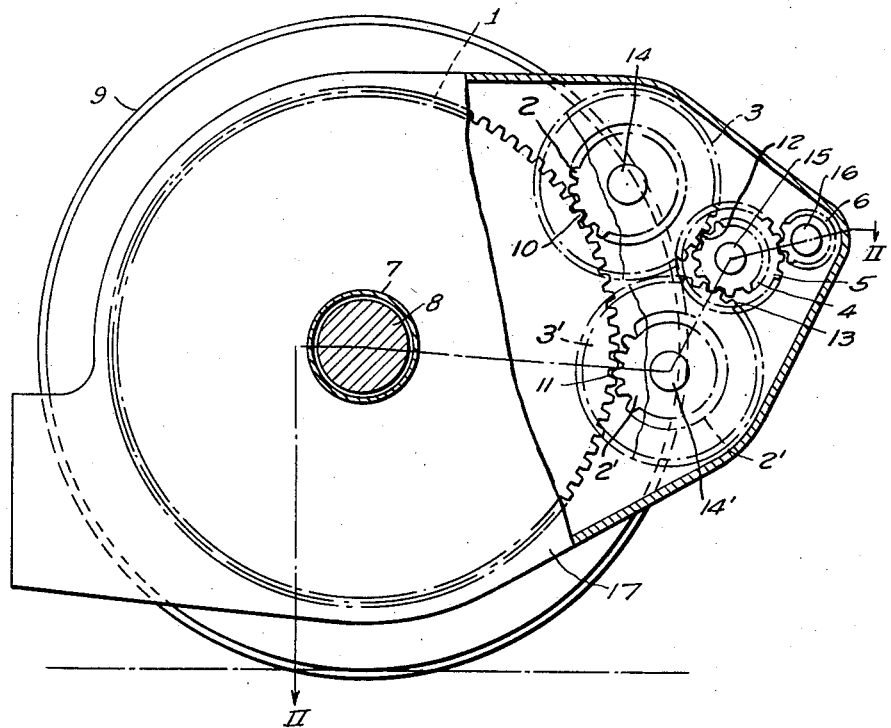
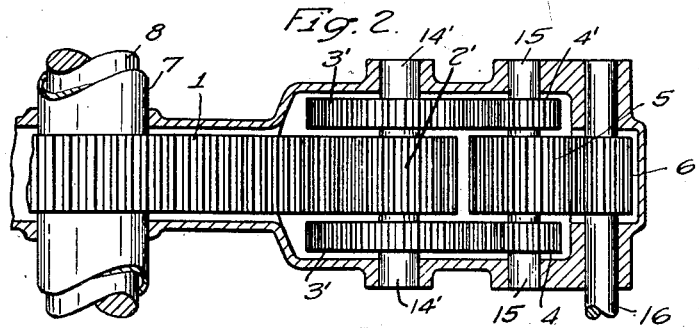
Fig.2.
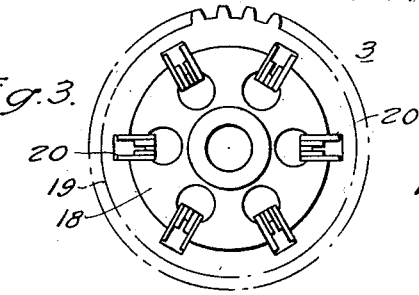
Fig.3.
WITNESSES:
E.A. McCloskey
N.S. Elliott
INVENTOR
Winston A. Brecht.
BY
W.R. Coley
ATTORNEY Patented Feb. 20, 1945

2,370,002

UNITED STATES PATENT OFFICE 2,370,002

LOCOMOTIVE GEAR DRIVE

Winston A. Brecht, Wilkinsburg, Pa., assignor to Westinghouse Electric & Manufacturing Company, East Pittsburgh, Pa., a corporation of Pennsylvania Application May 28, 1943, Serial No. 488,915

5 Claims. (Cl. 74—410)

My invention relates, generally, to gear drives and, more particularly, to gear drives for turbine-driven locomotives and the like.

One of the difficult problems in designing a turbine drive for a locomotive is that of providing a gear unit which is capable of transmitting a relatively large amount of horsepower and which may be mounted in the space available. The gear-face width that can be utilized is limited by the space between the locomotive side frames, which is fixed by the distance between the wheels. Therefore, the tooth stresses become excessive with gear faces of the maximum width which can be provided by utilizing conventional double or triple-reduction gearing.

An object of my invention, generally stated, is to provide a gear unit which shall be simple and efficient in operation and which may be economically manufactured and installed.

A more specific object of my invention is to reduce the tooth stresses in a gear unit.

Another object of my invention is to increase the effective gear-face width of a gear unit without increasing the space required for the gear unit.

Other objects of my invention will be explained fully hereinafter or will be apparent to those skilled in the art.

In accordance with my invention, the effective gear-face width of the gears of a reduction gear unit is doubled by utilizing the gear-faces of the low speed and intermediate gears twice, thereby practically doubling the capacity of the gear unit without increasing the width of the space required for the unit.

For a fuller understanding of the nature and objects of the invention, reference may be had to the following detailed description, taken in conjunction with the accompanying drawing, in which:

Figure 1 is a view, in side elevation of a gear unit embodying my invention, a portion being broken away for clearness;

Fig. 2 is a view, in section, taken along the line II—II of Fig. 1 and,

Fig. 3 is an enlarged view, in elevation, of one of the gears utilized in the gear unit.

Referring to the drawing, the gear unit shown therein comprises a low speed or driven gear 1, pinions 2 and 2', intermediate gears 3 and 3', driving pinions 4 and 4', a high speed gear 5 and a high speed pinion 6. The gear 1 may be pressed on a quill 7 that surrounds an axle 8 on which is disposed a driving wheel 9 for a locomotive (not shown). The gear 1 transmits torque to the axle 8 and the wheel 9 through a suitable resilient driving mechanism (not shown).

As shown most clearly in Fig. 1, the two pinions 2 and 2' are disposed to mesh with the gear 1 at points 10 and 11, respectively. The pinions 2 and 2' are mounted on shafts 14 and 14', respectively. An intermediate gear 3 is disposed on the shaft 14 on each side of the pinion 2 and similar gears 3' are disposed on the shaft 14', thereby making a total of four of the intermediate gears. Since each pair of intermediate gears 3 or 3' is secured to the same shaft 14 or 14' as one of the pinions 2 or 2', two reduction gears are provided. It will be seen that the one pair of intermediate gears 3 and the pinion 2, which is disposed therebetween, are mounted substantially above the other pair of intermediate gears 3' and the pinion 2', which is disposed therebetween.

As shown, two pinions 4 and 4' are disposed to intermesh with the four intermediate gears 3 and 3'. Thus, one pinion 4 meshes with two intermediate gears 3 and 3', which are disposed one above the other and the other pinion 4' meshes with the other two intermediate gears 3 and 3'. A high speed gear 5 is disposed between the two pinions 4 and 4' on the same shaft 15 which carries the pinions 4 and 4'.

A high speed pinion 6 is disposed to intermesh with the high speed gear 5. The pinion 6 is carried by a shaft 16 to which a turbine (not shown) may be connected. The gears are enclosed by a gear case 17, which also supports the shafts 14, 14', 15 and 16. The gear case 17 may be mounted in the locomotive frame in any suitable manner.

It will be seen that the intermediate and low speed gear trains provide two parallel paths for power flow. One path is from the high speed gear 5 through tooth contacts 12 and 10. The other path is from the gear 5 through tooth contacts 13 and 11. In this manner the effective gear-face width of the intermediate and low speed gears is doubled by utilizing the gear-faces of the low speed and intermediate gears twice.

In order to insure substantially equal division of the power flow in the two paths, the intermediate gears 3 and 3' may be of a flexible type, such as disclosed in Patent No. 1,602,298, issued October 5, 1926, to C. Bethel. As shown in Fig. 3, each gear 3 comprises a gear center 18 and a gear rim 19 which is movably mounted on the gear center 18. Torsional flexibility is provided in the gear by means of a plurality of spring nests 20 which transmit torque between the gear rim and the gear center.

It will be seen from the foregoing description that the present arrangement makes possible a greater concentration of power in one turbine than could be handled with the conventional double or triple-reduction gearing. The present structure substantially doubles the capacity of the transmission gear unit which can be mounted in a given space. While the gear unit herein illustrated and described is a triple-reduction gear, it will be understood that the same idea of a dual power path can be utilized in gearings of other types, such as double or quadruple reductions.

The present structure is particularly suitable for utilization in the conversion of existing steam locomotives from reciprocating to turbine drives. In this manner, the ratings of a large number of existing locomotives may be materially increased by converting them to turbine drives. The present gear unit may be mounted in the space available between the main frames of existing locomotives without changing these frames. The use of a conventional reduction gear unit might require the replacement or extensive modification of these frames.

It will, of course, be understood that the application of the present gear unit is not limited to existing locomotives which are being converted, but it may be utilized in newly designed locomotives as well. Furthermore, the present structure may be utilized for applications other than in turbine-driven locomotives.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a gear unit, in combination, a pair of driving gears, a single driven gear, a pair of intermediate gear shafts, and reduction gears comprising two driven gears and a pinion secured to each of said shafts, one of said driving gears intermeshing with one of said driven gears on each shaft and said single driven gear intermeshing with both of said pinions, thereby providing parallel power paths through the gear unit, part of said reduction gears on each shaft having torsional flexibility to provide for a substantially equal division of load between said parallel paths.

2. In a gear unit, in combination, a pair of driving gears, a single driven gear, a pair of intermediate gear shafts, and reduction gears comprising two driven gears and a pinion secured to each of said shafts, one of said driving gears intermeshing with one of said driven gears on each shaft and said single driven gear intermeshing with both of said pinions, thereby providing parallel power paths through the gear unit.

3. In a gear unit, in combination, a pair of driving gears, a single driven gear, two groups of reduction gears disposed between said gears, each group comprising two driven gears and a pinion disposed between the driven gears, one of said driving gears intermeshing with one of said driven gears of each group, and said single driven gear intermeshing with both of said pinions, thereby providing dual power paths through the gear unit.

4. In a gear unit, in combination, a pair of driving gears, a single driven gear, two groups of reduction gears disposed between said gears, each group comprising two driven gears and a pinion disposed between the driven gears, one of said driving gears intermeshing with one of said driven gears of each group, and said single driven gear intermeshing with both of said pinions, thereby providing dual power paths through the gear unit, part of said reduction gears of each group having torsional flexibility to provide a substantially equal division of load between said dual paths.

5. In a gear unit, in combination, a low speed gear, a pair of pinions engaging said gear, a shaft for each one of said pinions, a pair of intermediate gears secured to each one of said shafts, a pair of pinions engaging said intermediate gears, a shaft for said pinions, a high speed gear secured to said last named shaft, and a high speed pinion engaging said high speed gear thereby providing parallel power paths through the gear unit.

WINSTON A. BRECHT.